United States Patent
Jiang et al.

(10) Patent No.: US 11,231,213 B2
(45) Date of Patent: Jan. 25, 2022

(54) AIR CONDITIONING SYSTEM, CONTROL SYSTEM, AND CONTROL METHOD FOR AIR CONDITIONING SYSTEM EXPANSION VALVE

(71) Applicant: HANGZHOU SANHUA RESEARCH INSTITUTE CO., LTD., Hangzhou (CN)

(72) Inventors: Xiaojun Jiang, Hangzhou (CN); Likun Yang, Hangzhou (CN); Haiyan Wu, Hangzhou (CN); Yingchong Lu, Hangzhou (CN); Genxiang Zhang, Hangzhou (CN); Rongrong Zhang, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 479 days.

(21) Appl. No.: 16/088,327

(22) PCT Filed: Mar. 30, 2017

(86) PCT No.: PCT/CN2017/078814
§ 371 (c)(1),
(2) Date: Sep. 25, 2018

(87) PCT Pub. No.: WO2017/167232
PCT Pub. Date: Oct. 5, 2017

(65) Prior Publication Data
US 2020/0300517 A1   Sep. 24, 2020

(30) Foreign Application Priority Data
Mar. 31, 2016 (CN) .......................... 201610201269.5

(51) Int. Cl.
*F25B 49/02* (2006.01)
*F25B 41/31* (2021.01)
(Continued)

(52) U.S. Cl.
CPC ............ *F25B 41/31* (2021.01); *F25B 49/022* (2013.01); *B60H 2001/3285* (2013.01);
(Continued)

(58) Field of Classification Search
CPC ................... F25B 2600/2513; F25B 2341/068
See application file for complete search history.

(56) References Cited

U.S. PATENT DOCUMENTS 4,745,767 A * 5/1988 Ohya ..................... F25B 41/31
62/211
6,386,280 B1   5/2002 Egara
(Continued)

FOREIGN PATENT DOCUMENTS

CN    103033004    4/2013
CN    103673209    3/2014
(Continued)

OTHER PUBLICATIONS

Ralph Schwering, Fundamentals of LIN Protocol, 2004, http://webpages.eng.wayne.edu/~ad5781/ECECourses/ECE5620/Notes/LIN_Protocol.pdf (Year: 2004).*
(Continued)

*Primary Examiner* — Jonathan Bradford
(74) *Attorney, Agent, or Firm* — Boyle Fredrickson S.C.

(57) ABSTRACT

An air conditioning system. A first evaporator and a second evaporator are connected in parallel. A first electronic expansion valve is serially connected to the first evaporator, and a second electronic expansion valve is serially connected to the second evaporator, so that the opening degrees of the first electronic expansion valve and the second electronic expan-
(Continued)

sion valve can be separately adjusted, the first electronic expansion valve and the second electronic expansion valve can perform position correction according to valve opening position information of the first electronic expansion valve and the second electronic expansion valve stored by the air conditioning system, and separately adjust target positions to calibrated target positions. Also disclosed are a control system and a control method for the air conditioning system.

19 Claims, 8 Drawing Sheets

(51) Int. Cl.
  *B60H 1/32* (2006.01)
  *F25B 5/02* (2006.01)
(52) U.S. Cl.
  CPC ........... *F25B 5/02* (2013.01); *F25B 2341/068* (2013.01); *F25B 2500/19* (2013.01); *F25B 2600/2513* (2013.01)

(56) References Cited

U.S. PATENT DOCUMENTS

| | | | |
|---|---|---|---|
| 9,851,725 B2* | 12/2017 | Li | ........................ G05B 15/02 |
| 2006/0213208 A1 | 9/2006 | Iwaki et al. | |
| 2014/0326010 A1 | 11/2014 | Kawakami et al. | |
| 2014/0343735 A1 | 11/2014 | Li et al. | |
| 2014/0353391 A1 | 12/2014 | Burklin et al. | |
| 2015/0020540 A1* | 1/2015 | Wakisaka | ................ F25B 41/31 62/528 |
| 2016/0221416 A1 | 8/2016 | Jiang et al. | |
| 2016/0313037 A1* | 10/2016 | Takahashi | ............... F25B 41/31 |

FOREIGN PATENT DOCUMENTS

| | | |
|---|---|---|
| CN | 103968132 | 8/2014 |
| EP | 2 789 935 | 10/2014 |
| JP | H06241099 | 8/1994 |
| JP | H1089785 | 4/1998 |
| JP | 2003106609 | 4/2003 |
| JP | 2006266533 | 10/2006 |
| JP | 2008155850 | 7/2008 |
| JP | 2010043861 | 2/2010 |
| WO | 2013093991 | 6/2013 |
| WO | 2015043519 | 4/2015 |

OTHER PUBLICATIONS

Office Action dated Jul. 7, 2020 in JP App. No. 2018-550734.
Office Action dated Mar. 2, 2020 in KR App. No. 10-2018-7030952.
Search Report dated Jan. 24, 2020 in EP App. No. 17773262.5.
Office Action dated Nov. 26, 2019 in JP App. No. 2018-550734.

* cited by examiner

AIR CONDITIONING SYSTEM, CONTROL SYSTEM, AND CONTROL METHOD FOR AIR CONDITIONING SYSTEM EXPANSION VALVE

CROSS-REFERENCE TO RELATED APPLICATIONS

The present application is the national phase of International Application No. PCT/CN2017/078814, titled "AIR CONDITIONING SYSTEM, AND CONTROL SYSTEM AND CONTROL METHOD FOR AIR CONDITIONING SYSTEM", filed on Mar. 30, 2017, which claims the benefit of priority to Chinese Patent Application No. 201610201269.5 titled "AIR CONDITIONING SYSTEM, AND CONTROL SYSTEM AND CONTROL METHOD FOR AIR CONDITIONING SYSTEM", filed with the Chinese State Intellectual Property Office on Mar. 31, 2016, the entire disclosures of both applications are incorporated herein by reference.

TECHNICAL FIELD

The present application relates to the technical field of air conditioning systems, and particularly relates to an air conditioning system, and a control system and a control method for the air conditioning system.

BACKGROUND OF THE INVENTION

In a conventional automotive system, an automotive air conditioner is one of the main energy consumption units. With the increasing requirement on the energy saving of a vehicle, the energy saving of the automotive air conditioner has gradually been proposed. In an automotive air conditioning system, by effectively controlling a refrigerant flow quantity of the system, the system can achieve its best performance, which is beneficial to the energy saving of the air conditioning system. For example, in the air conditioning system of an electric automobile, a compressor is employed for variable-speed adjustment, the operating condition has a wide change range, and an electronic expansion valve may be employed to accurately adjust its opening degree, so as to adapt to the flow variation requirements of the compressor. As an executing component, the electronic expansion valve of the air conditioning system is required to accurately adjust its opening degree under a reasonable control logic, so that the air conditioning heat exchange system can achieve optimal performance and operate reliably. If the adjustment of the opening degree of the electronic expansion valve is out of synchronism, the adjustment of the air conditioning system may be out of control. According to the entire process of the operation of the current automotive air conditioning system, the control process of the electronic expansion valve generally includes several stages such as start-up, operating control, shutdown and the like. The performance of adjustment in the operating control stage directly affect the energy consumption adjustment of the air conditioner, therefore, the technical development trend in the field of the air conditioning systems at present is to improve the performance of the opening degree adjustment of the electronic expansion valve.

SUMMARY OF THE INVENTION

In order to address the above technical problems, an air conditioning system, a control method and a control device for the air conditioning system are provided according to the present application, which can reduce the risk of the electronic expansion valve being out of synchronism and optimize the control performance of the system.

In order to achieve the above objects, the air conditioning system according to the present application employs the following technical solution. An air conditioning system includes a compressor, a first heat exchanger, a second heat exchanger, a first evaporator, a second evaporator, a first electronic expansion valve and a second electronic expansion valve, wherein the first heat exchanger is arranged in a pipe between an outlet of the compressor and inlets of the first electronic expansion valve and the second electronic expansion valve; the second heat exchanger includes a first heat exchange portion and a second heat exchange portion, the first heat exchange portion and the second heat exchange portion are configured to exchange heat with each other, the first heat exchange portion of the second heat exchanger is arranged in a pipe between an outlet of the first heat exchanger and the inlets of the first electronic expansion valve and the second electronic expansion valve, and the second heat exchange portion of the second heat exchanger is arranged in a pipe between outlets of the first evaporator and the second evaporator and an inlet of the compressor; the first evaporator and the second evaporator are arranged in parallel, the first electronic expansion valve and the first evaporator are arranged in series, and the second electronic expansion valve and the second evaporator are arranged in series; and the air conditioning system is configured to adjust an opening degree of each of the first electronic expansion valve and the second electronic expansion valve separately, the first electronic expansion valve and the second electronic expansion valve are each configured to perform position adjustment according to valve opening position information, stored by the air conditioning system, of the first electronic expansion valve and the second electronic expansion valve, to adjust a target position to a calibrated target position.

Optionally, the system is a heat ventilation and air-conditioning and cooling system, the system further includes a third electronic expansion valve and a cooler, the third electronic expansion valve and the cooler are located between the outlet of the first heat exchanger and the inlet of the compressor, and the cooler is arranged in parallel with the first evaporator and the second evaporator.

Optionally, the third electronic expansion valve and the cooler are arranged in series, a flow quantity of a refrigerant in a branch where the cooler is located is controlled by adjusting an opening degree of the third electronic expansion valve, the cooler is a cooling element for a heat-generating component and is configured to reduce a temperature of the heat-generating component, and the third electronic expansion valve is configured to perform position adjustment according to valve opening position information stored in the air conditioning system, to adjust a target position to a calibrated target position.

A control system for an air conditioning system is further provided according to the present application, including an air conditioning controller and an electronic control part configured to control an electronic expansion valve to move, the air conditioning controller is a control center of the air conditioning system and is configured to receive and parse a control signal and/or input information of a vehicle system or a control panel, and send a control signal generated from parsing to the electronic expansion valve, and the electronic expansion valve is configured to be controlled by the control signal;

the air conditioning controller includes a memory cell or the electronic control part includes a memory cell, wherein the memory cell is configured to at least store detected valve opening position information of the electronic expansion valve; and the control system is configured to control a target position of the electronic expansion valve to be converted into a calibrated target position according to the valve opening position information provided by the memory cell.

Optionally, the memory cell is arranged in a central processing module of the air conditioning controller or a central processing module of the electronic control part of the electronic expansion valve, and the memory cell is formed by a non-volatile memory element; and wherein, the valve opening position information is a valve opening position value of the electronic expansion valve under a set pressure differential, the valve opening position value is detected by arranging a position detecting element, and the memory cell is configured to at least store the valve opening position value of the electronic expansion valve under the set pressure differential;

or, wherein, the valve opening position information is corresponding valve opening position values of the electronic expansion valve under different set pressure differentials, the valve opening position values are detected by arranging a position detecting element, the pressure differential values are detected by arranging a pressure detecting element, and the memory cell is configured to at least store each of the valve opening position values of the electronic expansion valve under different set pressure differentials and the corresponding pressure differential values.

Optionally, the control signal includes a target position signal for the electronic expansion valve, and in a program for adjusting an opening degree of the electronic expansion valve, the electronic expansion valve is configured to convert a value of the target position signal into a calibrated target position value according to the target position signal provided by the control system;

or, the control system is configured to detect a current pressure differential of the electronic expansion valve, obtain an adjusted target position value according to the current pressure differential, and convert the adjusted target position value into a calibrated target position value;

or, the control signal includes a target position signal and a pressure differential signal for the electronic expansion valve, and in a program for adjusting an opening degree of the electronic expansion valve, a value of the target position signal is converted into a calibrated target position value according to the pressure differential signal provided by the control system.

Optionally, the valve opening position information is sent to the electronic expansion valve in a local internet network control mode or a controller local area internet network control mode; and the electronic expansion valve is configured to receive a target position signal provided by the control system and store a value of the target position signal in the memory cell, or, the control system is configured to obtain the target position of the electronic expansion valve through calculation by the central processing module according to an input signal.

Optionally, the control signal provided by the air conditioning controller to the electronic expansion valve is a LIN signal, the control signal includes at least two LIN data bytes, each of the LIN data bytes includes eight data bits, stored original position information is indicated as all 8 bits of an Nth byte and two low-order bits of an (N+1)th byte (bit0 and bit1), and the pressure differential signal is expressed as six high-order bits of the (N+1)th byte (bit2 to bit7), wherein N is equal to or greater than 1, and the air conditioning controller is configured to send the target position signal and the pressure differential signal to the electronic expansion valve through the control signal, to perform valve opening position adjustment.

A control method for an air conditioning system is further provided according to the present application, including a control method for controlling an electronic expansion valve of the air conditioning system, wherein the control method for controlling the electronic expansion valve includes a stage of the electronic expansion valve acquiring its own valve opening position and a stage of calibrating the valve opening position of the electronic expansion valve, and the control method includes controlling the electronic expansion valve to perform position adjustment according to acquired valve opening position information, to adjust a target position value to a calibrated target position value.

Optionally, the air conditioning system detects valve opening position information of the electronic expansion valve under a specified pressure differential by arranging a position detecting element, and the valve opening position information is a valve opening position value of the electronic expansion valve under the specified pressure differential;

or, the air conditioning system detects corresponding valve opening position values of the electronic expansion valve under different set pressure differentials by arranging a position detecting element, and detects each of pressure differential values by arranging a pressure detecting element.

Optionally, the control method for the electronic expansion valve to acquire its own valve opening position includes:

detecting a valve opening position value of the electronic expansion valve under a specified pressure differential;

sending, by the air conditioning system, the valve opening position value to the electronic expansion valve in a local internet network control mode or a controller local area internet network control mode; and storing, by the electronic expansion valve, the valve opening position value in a memory cell of a central processing module of the electronic expansion valve or a memory cell of a central processing module of the air conditioning system;

or, the control method for the electronic expansion valve to acquire its own valve opening position includes:

detecting valve opening position values of the electronic expansion valve under different pressure differentials;

sending each of the valve opening position values and corresponding pressure differential information to the electronic expansion valve in a local internet network control mode or a controller local area internet network control mode; and storing, by the electronic expansion valve, each of the valve opening position values and the corresponding pressure differential information in a memory cell of a central processing module of the electronic expansion valve or a memory cell of a central processing module of the air conditioning system.

Optionally, the stage of calibrating the valve opening position of the electronic expansion valve includes:

sending, by a central processing module of the air conditioning system, a LIN command frame including a target position signal to the electronic expansion valve;

receiving, by the electronic expansion valve, the LIN command frame and storing, by the electronic expansion valve, a value of the target position signal in a memorizer of the electronic expansion valve;

converting, by the electronic expansion valve, the value of the target position signal into a calibrated target position value; and controlling the electronic expansion valve to move to a corresponding position according to the calibrated target position value;

or, the stage of calibrating the valve opening position of the electronic expansion valve includes:

sending, by a central processing module of the air conditioning system, a LIN command frame including a target position signal and a pressure differential signal to the electronic expansion valve;

receiving, by the electronic expansion valve, the LIN command frame and storing, by the electronic expansion valve, a value of the target position signal and a value of the pressure differential signal in a memory cell of the electronic expansion valve;

converting, by the electronic expansion valve, the value of the target position signal into a calibrated target position value according to the value of the pressure differential signal; and controlling the electronic expansion valve to move to a corresponding position according to the calibrated target position value.

Optionally, the stage of calibrating the valve opening position of the electronic expansion valve includes: obtaining, by a central processing module of the air conditioning system, a target position of the electronic expansion valve through calculation according to a detected current pressure differential or a received input signal.

Compared with the conventional technology, the present application can convert the target position into the calibrated target position by controlling the detected valve opening position information of the electronic expansion valve, which can reduce a valve opening deviation of the electronic expansion valve, reduce a risk of the electronic expansion valve being out of synchronization and optimize the control performance of the system.

DETAILED DESCRIPTION OF THE INVENTION

Figure 1:
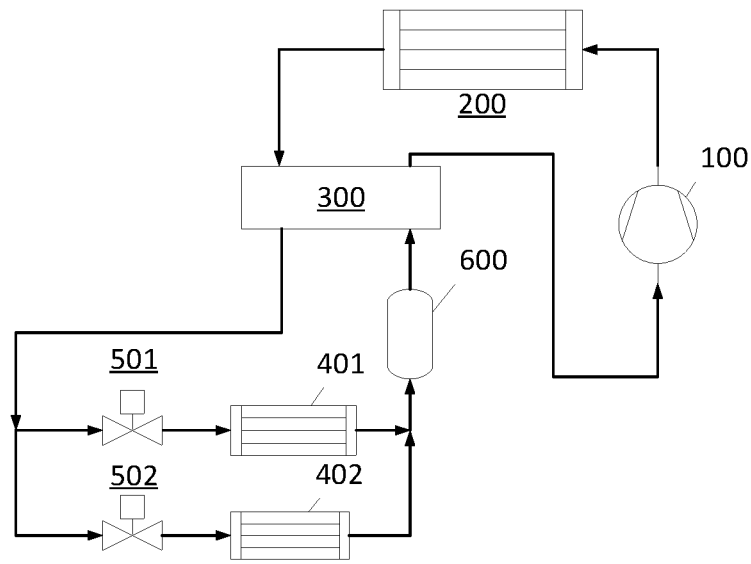
FIG. 1 is a schematic view showing a part of a system of an embodiment of an air conditioning system according to the present application.
Figure 2:
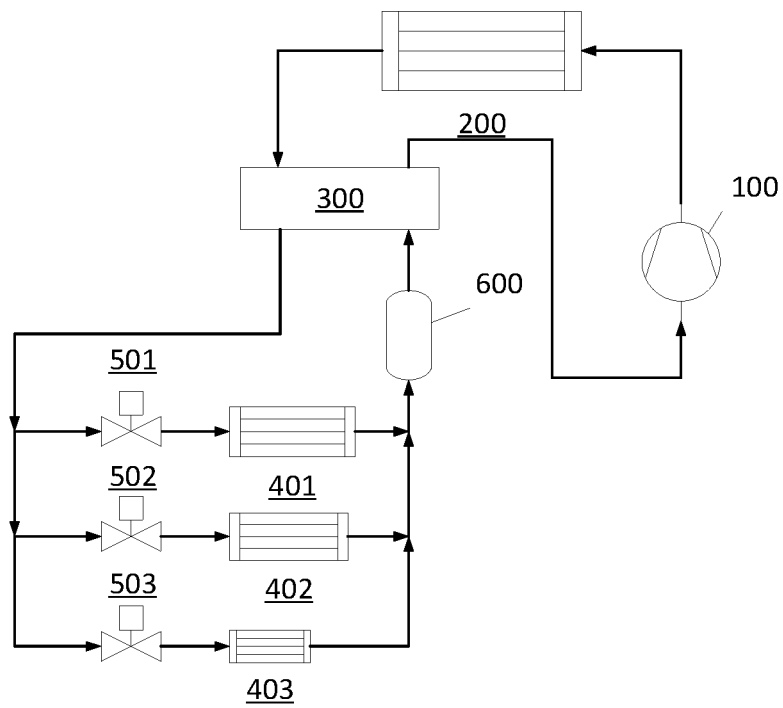
FIG. 2 is a schematic view showing a system of another embodiment of the air conditioning system according to the present application.

Referring to FIGS. 1 and 2, an air conditioning system is provided according to an embodiment, the air conditioning system includes at least a heat exchange system, such as an automotive or household air conditioning system. The heat exchange system exchanges heat with a cooling liquid or air at an environmental side through a refrigerant of the system. The heat exchange system has a cooling function and/or a heating function and/or a dehumidification function. Specifically, the air conditioning system can perform a refrigeration cycle or a heating cycle according to a control command, the air conditioning system forms a refrigerant flow path through a compressor 100, an outdoor heat exchanger, an indoor heat exchanger, and at least two electronic expansion valves (EXV) all connected together, to perform the refrigeration cycle when the indoor heat exchanger functions as an evaporator, and to perform the heating cycle when the indoor heat exchanger functions as a condenser. For example, the refrigeration cycle is performed in the hot summer to cool an interior of a car or a room, and the heating cycle is performed in the cold winter to warm the interior of the car or the room, and also the ambient air humidity of the interior of the car or the room can be adjusted, such that there is no mist in the car and the indoor air humidity is relatively suitable. The electronic expansion valve functions as a throttling element between an external heat exchanger and an internal heat exchanger in the cooling/heating cycle, to regulate a refrigerant flow quantity.

In the embodiment shown in FIG. 1, the heat exchange system includes a compressor 100, a first heat exchanger 200, a second heat exchanger 300, a first evaporator 401, a second evaporator 402, a first electronic expansion valve 501 and a second electronic expansion valve 502 which are connected by refrigerant pipes. The first heat exchanger 200 is arranged between an outlet of the compressor and inlets of the first and second electronic expansion valves. The second heat exchanger 300 includes a first heat exchange portion 301 and a second heat exchange portion 302, and the first heat exchange portion can exchange heat with the second heat exchange portion. Specifically, the second heat exchange portion is a two-passage heat exchanger, and a contact mode between a working medium in a flow passage of the first heat exchange portion and a working medium in a flow passage of the second heat exchange portion is heat transfer without mass transfer. The first heat exchange portion of the second heat exchanger is arranged in a pipe between an outlet of the first heat exchanger and the inlets of the first and second electronic expansion valves, and the second heat exchange portion of the second heat exchanger is arranged in a pipe between outlets of the first and second evaporators and an inlet of the compressor. A reservoir 600 is further arranged in a pipe between an inlet of the second heat exchanger 300 and outlets of the evaporators, to prevent the refrigerant from causing liquid impact to the compressor. In the heat exchange system, two branches are arranged in parallel between an outlet of the second heat exchanger and the inlet of the compressor, wherein, one branch includes the first electronic expansion valve and the first evaporator, and the other branch includes the second electronic expansion valve and the second evaporator. Specifically, the first evaporator 401 is located between an outlet of the first electronic expansion valve and the inlet of the compressor, the second evaporator 402 is located between an outlet of the second electronic expansion valve and the inlet of the compressor, the first electronic expansion valve 501 and the first evaporator 401 are arranged in series, and the second electronic expansion valve 502 and the second evaporator 402 are arranged in series. The first electronic expansion valve controls the refrigerant flow quantity of the branch where the first evaporator is located by adjusting its opening degree, and the second electronic expansion valve controls the refrigerant flow quantity of the branch where the second evaporator is located by adjusting its opening degree, and thus the branches can be effectively controlled respectively according to specific situations, to reduce interferences between each other.

In another embodiment shown in FIG. 2, it can be seen from a connection manner between the components of the air conditioning system that, the heat exchange system is further provided with another branch arranged in parallel with the above two branches, and this branch is between the outlet of the second heat exchanger and the inlet of the compressor, and includes a third electronic expansion valve and a cooler. The cooler can serve as a battery cooling element to reduce the temperature of a heat-generating battery device. Specifically, the third electronic expansion valve and the cooler are arranged in series, and the third electronic expansion valve controls the refrigerant flow quantity of the branch where the battery cooler is located by adjusting its opening degree. It should be noted that, a control system and a control method of the first, second and third expansion valves are described hereinafter, in which, the first, second and third expansion valves can be collectively referred to as the electronic expansion valve (EXV). The first heat exchanger 200 serves as a heat absorption device or a heat dissipation device, such as an evaporator or a condenser, and can absorb heat from an exterior environmental medium or dissipate heat to the exterior environmental medium through the refrigerant. The second heat exchanger 300 serves as a heat absorption device, such as the evaporator, and can absorb heat from the environmental medium through the refrigerant. The third heat exchanger 400 serves as a heat dissipation device, such as a condenser or an air cooler, and can dissipate heat to the environmental medium through the refrigerant.

According to a pressure differential environment of the system where each of the electronic expansion valves is located, the valve opening position of the electronic expansion valve can be adjusted, and a zero point calibration of the flow quantity is performed on the electronic expansion valve, which can reduce a valve opening deviation among the electronic expansion valves of the system and/or can correct the valve opening deviation of each of the electronic expansion valves under different refrigerant pressure differentials. Specifically, by adjusting the valve opening position of the electronic expansion valve, a deviation or an error between a flow quantity value of each of the first evaporator and the second evaporator and a required target value is minimized, which prevents the electronic expansion valve in a certain branch from opening too early or too late to cause a relatively large flow deviation, and each of the electronic expansion valves is calibrated as a "standard valve", to increase an accuracy degree of the system control and prevent a system oscillation caused by the flow deviation between the branches. Further, the valve opening position of each of the electronic expansion valves is adjusted, thus when the refrigerant pressure differential of the system changes or varies, the valve opening position of each of the electronic expansion valves won't open too early or too late due to the variation of the pressure differential, thereby improving the performance of the opening degree control accuracy of the electronic expansion valve. It should be noted that, a valve opening position value and relevant parameters of the electronic expansion valve refer to the corresponding number of steps taken by a stepping motor operating from a fully closed position until the electronic expansion valve starts to allow fluid to pass through. when mechanical manufacturing and assembly technology levels of the electronic expansion valves have differences, there will be a large deviation in the valve opening positions between different electronic expansion valves, for example, when a nominal value of the valve opening position is 32 half-steps, there may be a deviation of positive or negative 12 half-steps. Further, the pressure differential of the electronic expansion valve will also affect the valve opening position, generally, the greater the pressure differential is, the larger the valve opening position is. In this way, the deviation in the valve opening positions between different electronic expansion valves will lead to a great flow quality deviation, that is, flow curves of different valves are different, which will affect the control of a refrigeration cycle system employing these electronic expansion valves, and thus affecting the control performance of the system.

Figure 3:
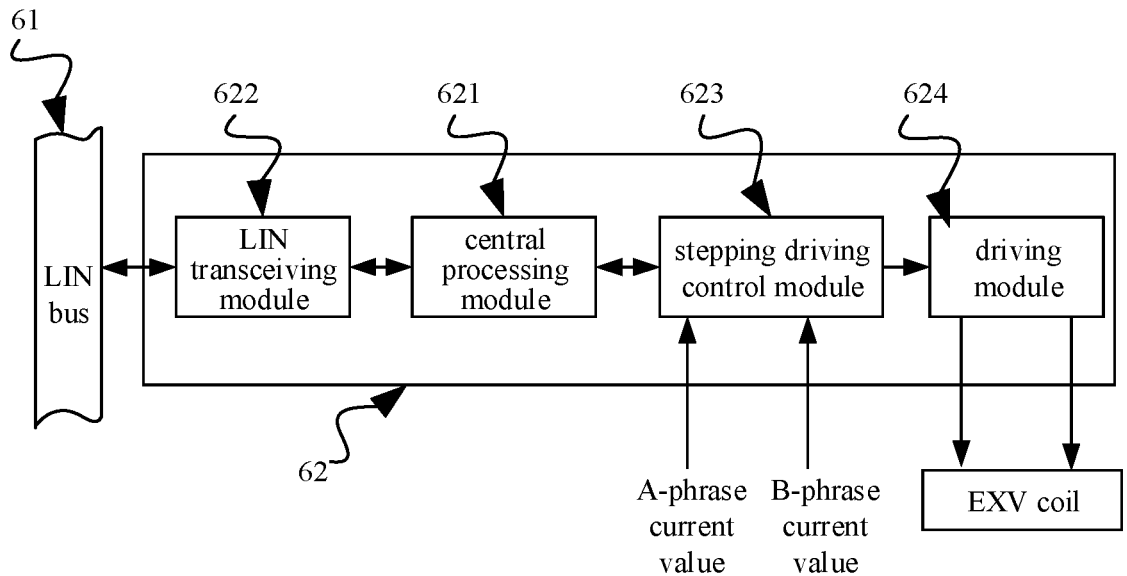
FIG. 3 shows an embodiment of an electronic control part of an electronic expansion valve of the air conditioning system according to the present application.
Figure 4:
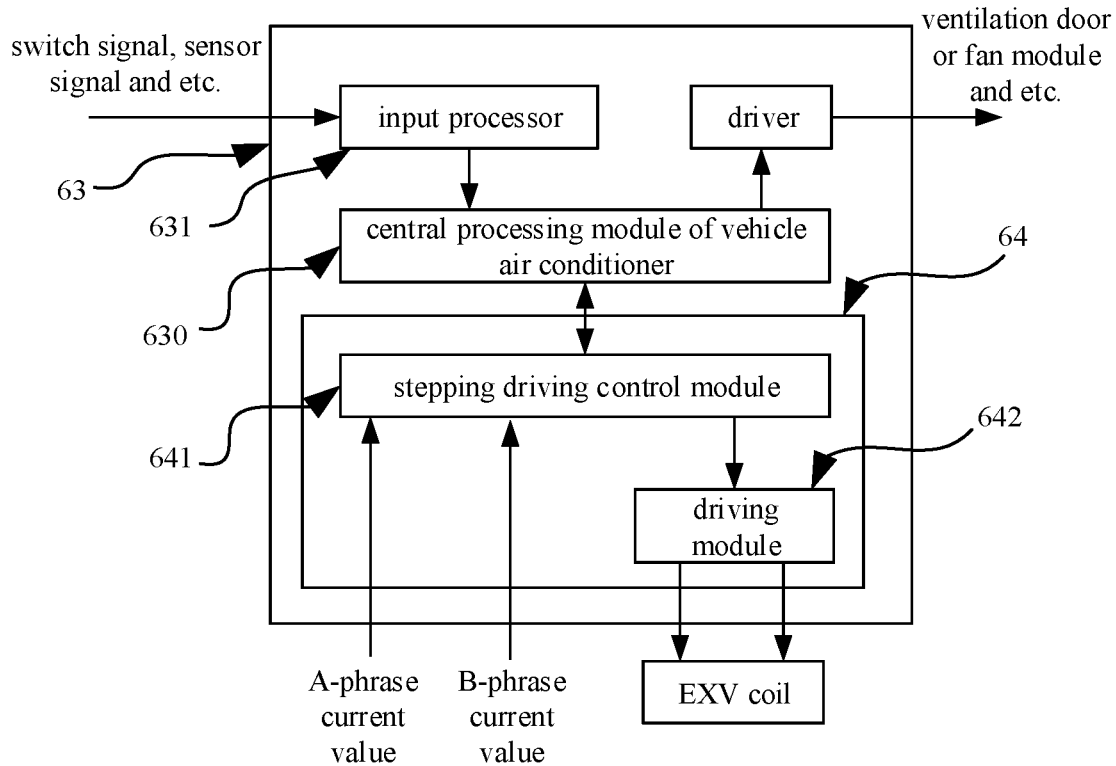
FIG. 4 shows another embodiment of the electronic control part of the electronic expansion valve of the air conditioning system according to the present application.

Referring to FIGS. 3 and 4, two embodiments of the control system employed by the air conditioning system are schematically shown. The control system includes an air conditioning controller and an electronic control part configured to control an action of the EXV. The air conditioning controller functions as a control center of the air conditioning system, and is configured to receive and parse a control signal and/or input information and/or sensor information from a vehicle system or a control panel, and send a control signal generated from parsing to the EXV. The electronic control part of the EXV is configured to receive and parse input information and/or sensor information sent from the air conditioning controller, and combine the received and parsed input information and/or sensor information with a preset control program for the EXV stored in the electronic control part and/or feedback information stored in the electronic control part, to obtain a control signal through calculation, and then convert the control signal into an electric quantity that can be executed by the EXV, thus the EXV can be controlled to move by the electric quantity. The air conditioning controller includes a memory cell or the electronic control part includes a memory cell, wherein the memory cell can at least store the detected valve opening position information of the electronic expansion valve.

According to the valve opening position information provided by the memory cell, the control system can control the target position of the electronic expansion valve to be converted into a calibrated target position.

The control system further includes a position detecting module configured to detect a valve opening value of the EXV under a specific refrigerant pressure differential and/or under different refrigerant pressure differentials. Specifically, the valve opening position information may be the valve opening position value of the electronic expansion valve under a set pressure differential, and in this case, the valve opening position value is detected by arranging a position detecting element. The memory cell can at least store the valve opening position value of the electronic expansion valve under the set pressure differential, which can achieve an effect of adjusting the valve opening position under a specific pressure differential, and the specific pressure differential may be a random pressure differential value between 0 Mpa and 15 Mpa. Or, the valve opening position information is corresponding valve opening position values of the electronic expansion valve under different set pressure differentials, and in this case, the valve opening position values are detected by arranging the position detecting element, the pressure differential values are detected by arranging a pressure detecting element, and the memory cell can store all the valve opening position values of the electronic expansion valve under different set pressure differentials and the corresponding pressure differential values.

Specifically, the air conditioning controller includes a memory cell, wherein the memory cell is formed by a non-volatile memory element, which can save data when the EXV is powered off. The memory cell can store the detected valve opening position value of the EXV, including the detected valve opening value of the EXV under a specific pressure differential and/or the detected valve opening value of the EXV under different refrigerant pressure differentials. The EVX is used to obtain its own valve opening position, and the position calibration can be performed during the opening degree adjustment of the EXV. Specifically, the air conditioning controller is provided with a central processing module, the memory cell can be integrally arranged in the central processing module of the air conditioning controller. Or, in another embodiment, the electronic control part of the EXV provides a memory cell, specifically, the electronic control part provides the memory cell by arranging the central processing module, and the memory cell can be integrally arranged in the central processing module of the electronic control part. It should be noted that, position values of the EXV, including the valve opening position value of the EXV, can be indicated by the position where a valve needle is located, for example, the position values can be indicated by the number of steps or relevant parameters, for example, the position of zero step indicates that the valve needle is at the bottom, at this time the flow quantity is zero; while, the position of 480 steps indicates that the valve needle is at the top, and at this time the flow quantity is maximum.

Specifically, the control signal sent to the electronic expansion valve at least includes a target position signal for the electronic expansion valve. In a program for adjusting the opening degree of the electronic expansion valve, the electronic expansion valve can convert a value of the target position signal into a calibrated target position value according to the target position signal provided by the control system; or, the control system detects the current pressure differential of the electronic expansion valve, and obtains an adjusted target position value according to the current pressure differential, and then converts the adjusted target position value into the calibrated target position value. Or, in another embodiment, the control signal at least includes a target position signal for the electronic expansion valve and a pressure differential signal, and in the program of opening degree adjustment of the electronic expansion valve, the value of the target position signal is converted into the calibrated target position value according to the pressure differential signal provided by the control system. In the control system, the valve opening position information is sent to the electronic expansion valve in a local internet network control mode or a controller local area internet network control mode. The electronic expansion valve receives the target position signal provided by the control system, and stores the value of the target position signal in the memory cell; or, the control system obtains the target position of the electronic expansion valve through calculation by the central processing module according to the input signal. By adjusting the valve opening position of the EXV as a standard zero point, each of the electronic expansion valves can be adjusted as a "standard electronic expansion valve" in terms of the opening degree adjustment, which can reduce the flow differential caused by different EXVs having different valve opening positions, and can also prevent the valve opening position of the same EXV from varying with the pressure differential, and even when the pressure differential of the system fluctuates, the valve opening deviation of the electronic expansion valve can still be reduced, thereby improving the stability and accuracy of the control of the refrigeration system.

In the embodiment of the control system shown in FIG. 3, the control system is a LIN control system, which employs the local internet network (Local Internet Network, LIN) control mode for signal transmission. The LIN control system includes a master node and multiple slave nodes. In this embodiment, the air conditioning controller 61 (such as a HVAC controller) serves as a LIN master node or a LIN bus, and the EXV serves as one of the slave nodes. The electronic control part 62 of the EXV includes the central processing module 621, a bus signal receiving/sending module (a LIN transceiving module 622), a stepping driving control module 623, and a driving module 624. The electronic control part is configured to control an action of a mechanical part of the EXV, such as a rotor or a transmission part of the stepping motor, or the valve needle (not shown in the figure). Specifically, the electronic control part can control the rotation of the rotor, and then the rotation of the rotor drives the valve needle to move up and down, so that the opening degree can be controlled by adjusting the position of the valve needle. In an opening degree adjusting stage of the EXV, the target position received by the EXV can be adjusted as the calibrated target position by acquiring the valve opening position information stored in the memory cell, which can reduce the valve opening deviation of the EXV, reduce the risk of the EXV being out of synchronism, improve the adjustment accuracy of the EXV, and in particular, can avoid the relatively great valve opening deviation of the EXV after a long-term use that may affect the stability and accuracy of the control of the refrigeration system.

The LIN transceiving module 622 sends a detected signal from the LIN bus to the central processing module.

The central processing module 621 is configured to parse the signal to obtain a parsing result, and send a feedback signal corresponding to the parsing result to the LIN bus through a LIN signal sending module.

The central processing module 621 is configured to receive and parse control information from a main control board of the air conditioning system, send a parsed control signal for the EXV to the driving control module, record or store current position information of the EXV, and send a feedback signal corresponding to the parsing result to the LIN bus through the bus transceiving module.

The driving control module 623 is configured to receive the control signal for controlling the EXV sent from the central processing module of the air conditioning controller or the electronic control part, and transmit the control signal to the driving module.

The driving module 624 is configured to provide an electronic coil with an electrical signal that satisfies requirements of the control signal, and the electrical signal that satisfies the requirements of the control signal can control the valve needle to move.

Figure 5:
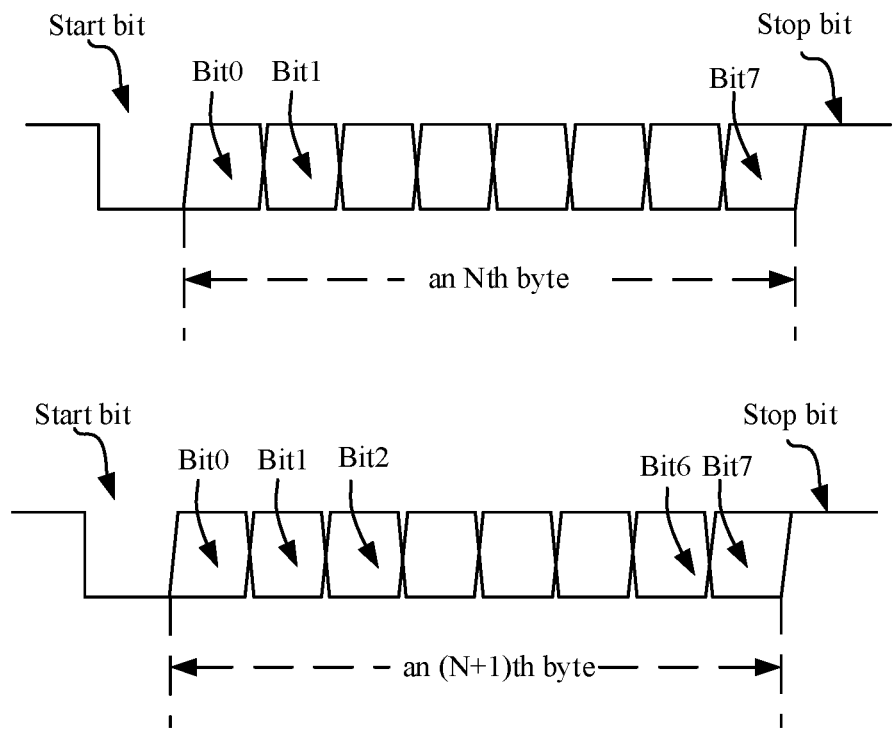
FIG. 5 is a schematic view showing a data segment of a part of a LIN signal for performing valve opening position adjustment of the electronic expansion valve shown in FIG. 3.

The control signal provided to the EXV from the air conditioning controller is a LIN signal, and referring to FIG. 5, the LIN signal at least includes two LIN data bytes, and each of the LIN data bytes includes eight data bits. The target position information is represented by a LIN position signal as all 8 bits of an Nth byte and two low-order bits of an (N+1)th byte (bit0 and bit1), to indicate the target position that the LIN master node requires the EXV to arrive. The "pressure differential" signal is expressed as six high-order bits of the (N+1)th byte (bit2 to bit7), wherein N is equal to or greater than 1. With these two signals, the LIN master node can complete a control step that the LIN master node delivers a LIN command frame including the "target position" signal and the "pressure differential" signal to the EXV. In addition, regarding definitions of other LIN signals, references may also be made to the definition of the above two signals in the response data of the LIN command frame.

In another embodiment of the air conditioning system shown in FIG. 4, compared with the embodiment shown in FIG. 3, the difference lies in that the electronic control part of the EXV can be integrally arranged in the air conditioning controller 63.

The air conditioning controller 63 is configured to receive input information and/or sensor information of the main control board of the air conditioning system, combine the received input information and/or sensor information with a preset control program for the EXV stored in the air conditioning controller and/or feedback information stored in the air conditioning controller, obtain a control signal through calculation, and send the control signal to the electronic control part 64. The feedback information at least includes initialization completion status information and the position information stored in the memory cell of the air conditioning controller.

The electronic control part 64 is configured to convert the control signal into an electric quantity that can be executed by the EXV, and thus the EXV can be controlled by the electric quantity.

The air conditioning controller is provided with a central processing module 630, and the electronic control part 64 of the EXV is provided with a driving control module 641 and a driving module 642. The central processing module of the air conditioning controller is configured to receive input information, switch information and/or sensor information, obtain a control signal for the EXV through calculation, send the control signal to the driving control module, and record or store current position information of the EXV. Specifically, in the opening degree adjusting stage of the EXV, the valve opening position information is stored in the central processing module of the air conditioning controller, the central processing module of the air conditioning controller can perform self-recognition, and the central processing module of the air conditioning controller can obtain not only a target position but also a pressure differential value of the EXV through calculation according to the input information or the input signal.

In this embodiment, the memory cell of the air conditioning controller is integrally arranged in the central processing module 630 of the air conditioning controller, and the air conditioning controller 63 can convert the target position into a calibrated target position according to the stored valve opening position information or according to both the valve opening position information and the pressure differential value of the EXV.

Reference is made to FIGS. 6 to 10, which schematically show control methods corresponding to the two types of air conditioning systems shown in FIGS. 3 and 4. The control methods include a control method for controlling a valve opening position of the EXV, which includes a stage of the EXV acquiring its own valve opening position and a stage of calibrating the valve opening position of the EXV. The stage of the EXV acquiring its own valve opening position may be performed before the EXV is connected to a corresponding LIN network. The electronic expansion valve is controlled to perform position adjustment according to the acquired valve opening position information, to adjust a target position value to a calibrated target position value.

In the control method, the air conditioning system is provided with a position detecting element configured to detect the valve opening position information of the electronic expansion valve under a specified pressure differential, and the valve opening position information is the valve opening position value of the electronic expansion valve under the specified pressure differential; or, the air conditioning system is provided with a position detecting element configured to detect corresponding valve opening position values of the electronic expansion valve under different set pressure differentials, and is provided with a pressure detecting element configured to detect each of pressure differential values.

In the control method, the control method for the electronic expansion valve to acquire its own valve opening position includes:

detecting a valve opening position value of the electronic expansion valve under a specified pressure differential;

sending, by the air conditioning system, the valve opening position value to the electronic expansion valve in the local internet network control mode or the controller local area internet network control mode; and storing, by the electronic expansion valve, the valve opening position value in the memory cell of the central processing module of the electronic expansion valve or the memory cell of the central processing module of the air conditioning system;

or, the control method for the electronic expansion valve to acquire its own valve opening position includes:

detecting valve opening position values of the electronic expansion valve under different pressure differentials;

sending each of the valve opening position values and corresponding pressure differential information to the electronic expansion valve in the local internet network control mode or the controller local area internet network control mode; and storing, by the electronic expansion valve, each of the valve opening position values and the corresponding pressure differential information in the memory cell of the central processing module of the electronic expansion valve or the memory cell of the central processing module of the air conditioning system.

In the control method, the stage of calibrating the valve opening position of the electronic expansion valve includes:

sending, by the central processing module of the air conditioning system, a LIN command frame including the target position signal to the electronic expansion valve;

receiving, by the electronic expansion valve, the LIN command frame and storing, by the electronic expansion valve, the value of the target position signal in a memorizer of the electronic expansion valve;

converting, by the electronic expansion valve, the value of the target position signal into a calibrated target position value; and controlling the electronic expansion valve to move to a corresponding position according to the calibrated target position value;

or, the stage of calibrating the valve opening position of the electronic expansion valve includes:

sending, by the central processing module of the air conditioning system, a LIN command frame including the target position signal and the pressure differential signal to the electronic expansion valve;

receiving, by the electronic expansion valve, the LIN command frame and storing, by the electronic expansion valve, the value of the target position signal and the value of the pressure differential signal in the memory cell of the electronic expansion valve;

converting, by the electronic expansion valve, the value of the target position signal into a calibrated target position value according to the value of the pressure differential signal; and controlling the electronic expansion valve to move to a corresponding position according to the calibrated target position value.

The stage of calibrating the valve opening position of the electronic expansion valve further includes: obtaining, by the central processing module of the air conditioning system, the target position of the electronic expansion valve through calculation according to the detected current pressure differential or the received input signal.

Figure 6A:
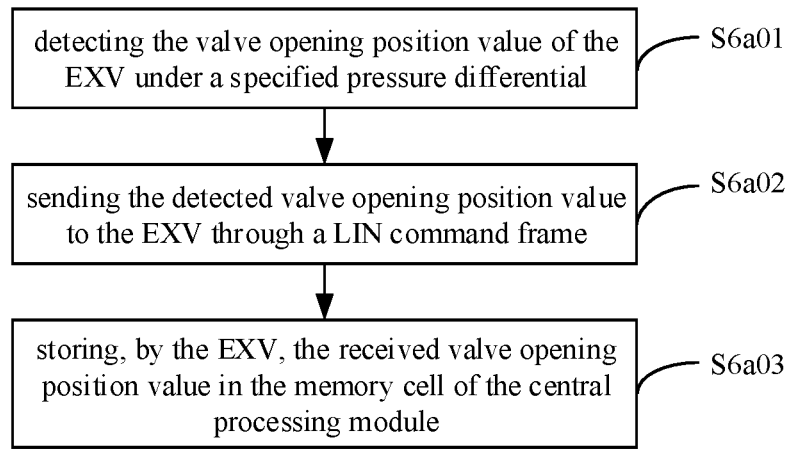
FIGS. 6a and 6b are schematic views showing a control method for performing valve opening position adjustment of the electronic expansion valve shown in FIG. 3 in a LIN control mode.
Figure 6B:
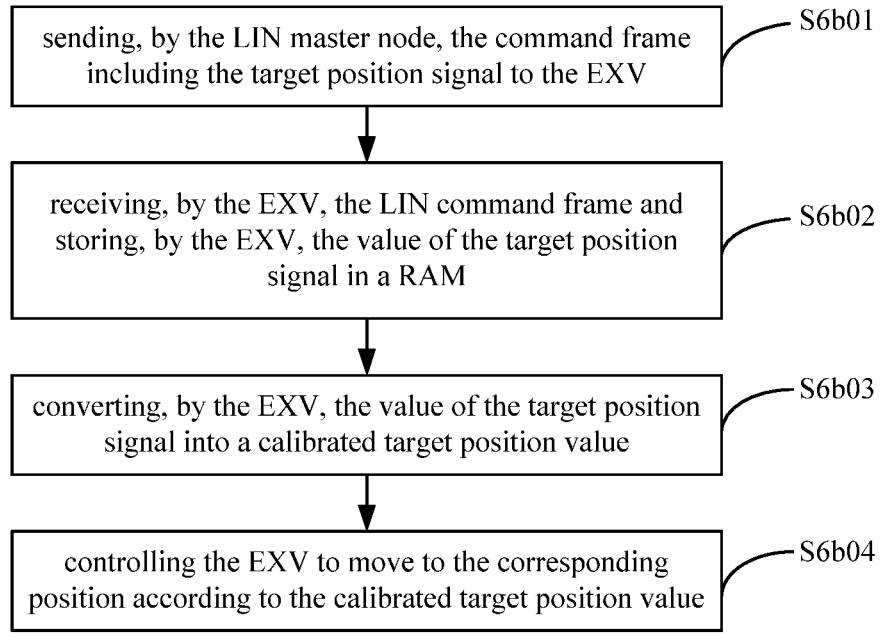

Specifically, referring to FIG. 6 (including FIGS. 6a and 6b), which shows the control method of the air conditioning system for controlling the EXV, the air conditioning controller communicates with the EXV in the local internet network control mode, and a first embodiment of the air conditioning system in FIG. 3 is schematically shown in FIG. 6.

Referring to FIG. 6a, the stage of the EXV acquiring its own valve opening position includes the following steps:

S6a01: detecting the valve opening position value of the EXV under a specified pressure differential;

S6a02: sending the detected valve opening position value to the EXV through a LIN command frame; and S6a03: storing, by the EXV, the received valve opening position value in the memory cell of the central processing module.

Referring to FIG. 6b, the stage of calibrating the valve opening position of the EXV in the LIN network includes the following steps:

S6b01: sending, by the LIN master node, the command frame including the target position signal to the EXV;

S6b02: receiving, by the EXV, the LIN command frame and storing, by the EXV, the value of the target position signal in the memory cell or a memorizer RAM additionally arranged;

S6b03: converting, by the EXV, the value of the target position signal into a calibrated target position value; and S6b04: controlling the EXV to move to the corresponding position according to the calibrated target position value.

Figure 7A:
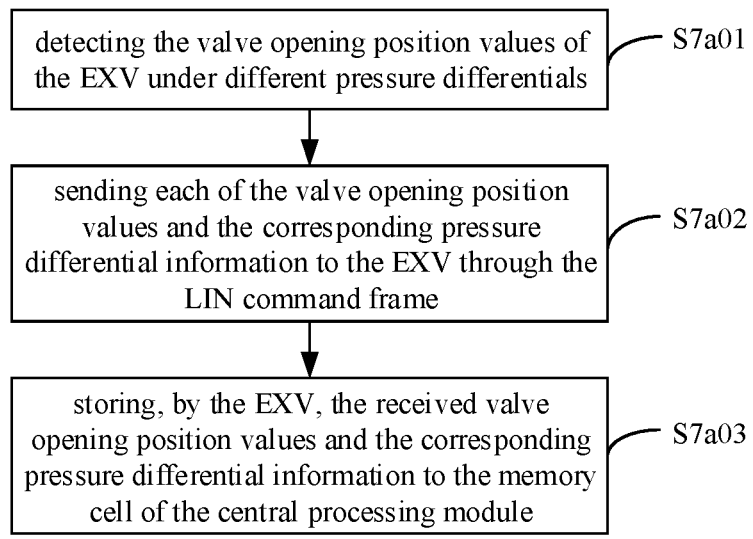
FIGS. 7a and 7b are schematic views showing a second control method for performing valve opening position adjustment of the electronic expansion valve shown in FIG. 3 in the LIN control mode.
Figure 7B:
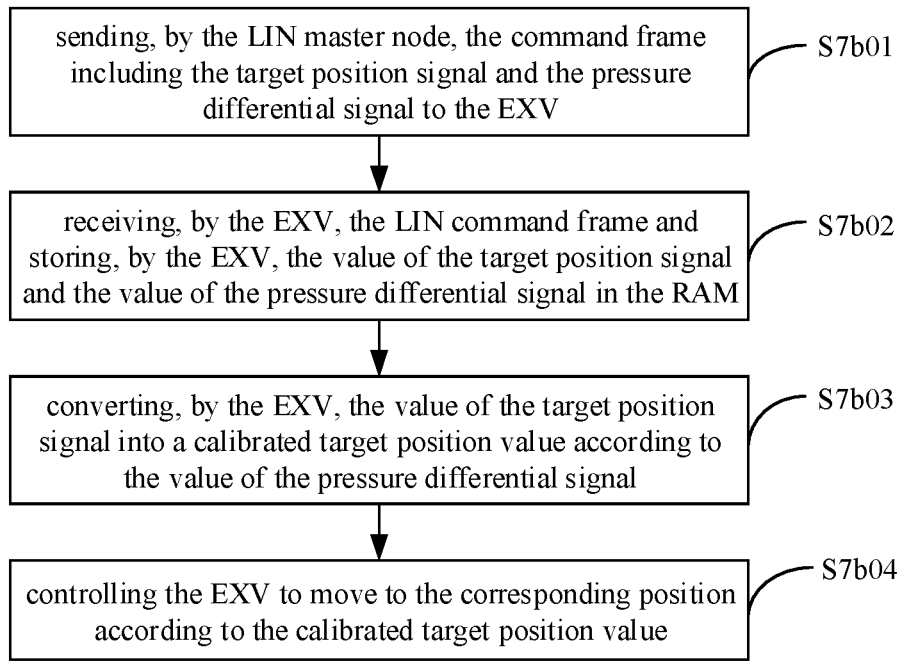

Referring to FIG. 7 (including FIGS. 7a and 7b), which schematically shows a second embodiment of the air conditioning system in FIG. 3, compared with the control method shown in FIG. 6, the improvement in the embodiment of FIG. 7 is that the EXV stores the corresponding valve opening position values under different pressure differentials, and correspondingly, the pressure differential signal is added to the LIN command frame sent from the LIN master node to the EXV, which facilitates adjusting the valve opening position of the EXV within a wide range of working pressure differential.

Referring to FIG. 7a, in this embodiment, the stage of the EXV acquiring its own valve opening position includes the following steps:

S7a01: detecting the valve opening position values of the EXV under different pressure differentials;

S7a02: sending each of the valve opening position values and the corresponding pressure differential information to the EXV through the LIN command frame; and S7a03: storing, by the EXV, the received valve opening position values and the corresponding pressure differential information in the memory cell of the central processing module.

Referring to FIG. 7b, in this embodiment, the stage of calibrating the valve opening position of the EXV in the LIN network includes the following steps:

S7b01: sending, by the LIN master node, the command frame including the target position signal and the pressure differential signal to the EXV;

S7b02: receiving, by the EXV, the LIN command frame and storing, by the EXV, the value of the target position signal and the value of the pressure differential signal in the RAM;

S7b03: converting, by the EXV, the value of the target position signal into a calibrated target position value according to the value of the pressure differential signal; and S7b04: controlling the EXV to move to the corresponding position according to the calibrated target position value.

Figure 8A:
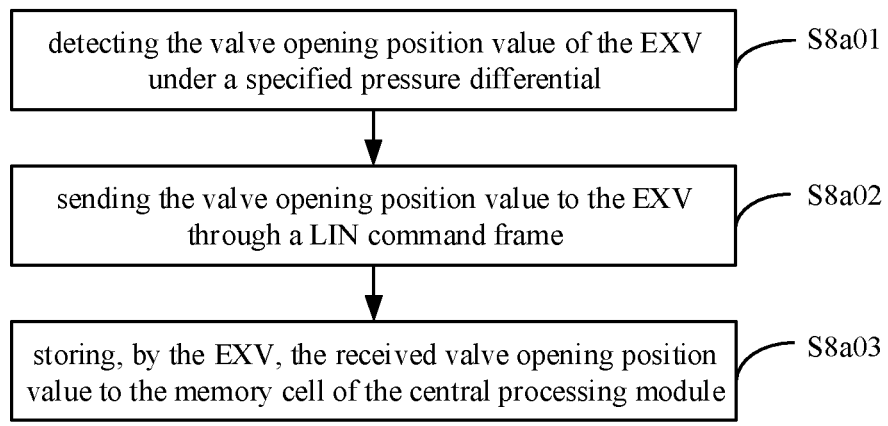
FIGS. 8a and 8b are schematic views showing a third control method for performing valve opening position adjustment of the electronic expansion valve shown in FIG. 3 in the LIN control mode.
Figure 8B:
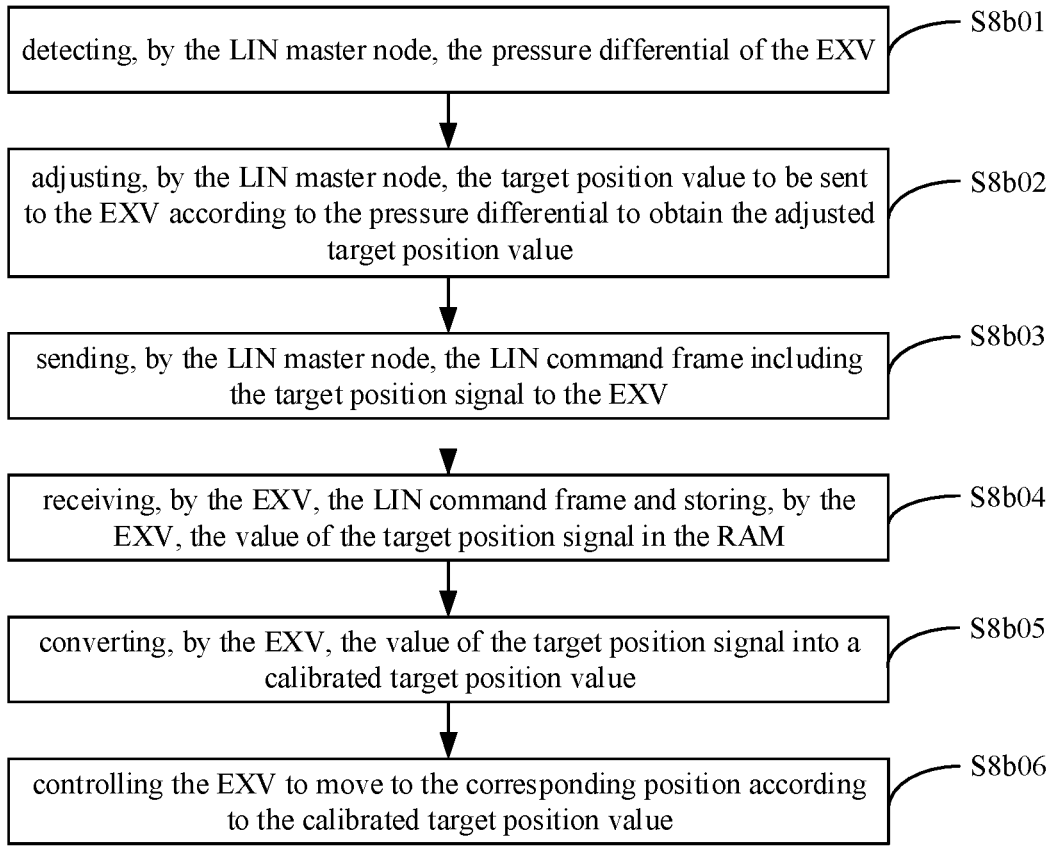

Referring to the control method shown in FIG. 8 (including FIG. 8a and FIG. 8b), which schematically shows a third embodiment of the air conditioning system in FIG. 3, the EXV itself stores a valve opening position value under a specified pressure differential, the valve opening position value is combined with a functional relationship between the pressure differential and the valve opening position value pre-stored by the LIN master node of the system where the EXV is located, or the target position to be sent to the EXV may also be adjusted according to the pressure differential information, therefore, an effect that the valve opening position value is adjusted in the entire pressure differential range can be similarly achieved without adding the LIN pressure differential signal shown in FIG. 7.

Referring to FIG. 8a, in this embodiment, the stage of the EXV acquiring its own valve opening position includes the following steps:

S8a01: detecting the valve opening position value of the EXV under a specified pressure differential;

S8a02: sending the valve opening position value to the EXV through a LIN command frame; and S8a03: storing, by the EXV, the received valve opening position value in the memory cell of the central processing module.

Referring to FIG. 8b, in this embodiment, the stage of calibrating the valve opening position of the EXV in the LIN network includes the following steps:

S8b01: detecting, by the LIN master node, the pressure differential of the EXV;

S8b02: adjusting, by the LIN master node, the target position value to be sent to the EXV according to the pressure differential to obtain the adjusted target position value;

S8b03: sending, by the LIN master node, the LIN command frame including the target position signal to the EXV;

S8b04: receiving, by the EXV, the LIN command frame and storing, by the EXV, the value of the target position signal in the RAM;

S8b05: converting, by the EXV, the value of the target position signal into a calibrated target position value; and S8b06: controlling the EXV to move to the corresponding position according to the calibrated target position value.

In the embodiment shown in FIG. 8, descriptions are made in detail by taking a specified pressure differential of 3 Mpa and a detected valve opening position of 22 half steps as an example. However, it should be noted that, the specified pressure differential is not limited to 3 Mpa.

In this embodiment, the stage of the EXV acquiring its own valve opening position includes the following steps:

detecting the valve opening position under the pressure differential of 3 Mpa is 22 half steps;

sending the valve opening position value to the EXV through the LIN command frame; and storing, by the EXV, the valve opening position value in the memory cell of the EXV.

Besides, the stage of calibrating the valve opening position of the EXV includes the following steps:

assuming the detected pressure differential of the EXV by the LIN master node is 5 Mpa;

assuming the target position for the EXV to take as originally required by the LIN master node is 102 half steps, since the current actual pressure differential is 5 Mpa, combining the current actual pressure differential with the functional relationship between the pressure differential and the valve opening position value pre-stored by the air conditioning system, pre-adjusting the target position to be 107 half steps, which can further eliminate the valve opening deviation;

sending, by the LIN master node, the LIN command frame to the EXV, wherein the value of the target position signal is 107;

receiving, by the EXV, the LIN command frame and storing, by the EXV, the value of the target position signal in the RAM; and combining, by the EXV, the value of the target position signal with the stored valve opening position of 22 half steps, converting, by the EXV, the original target position according to the following formula: the calibrated target position S of the EXV=(the value of the LIN target position signal−a standard valve opening position value)+the valve opening position value of the EXV.

The above parameters are calculated according to the above formula, and the calibrated target position value S is 97 half steps, that is, when the EXV moves to the position of 97 half steps, the corresponding flow quantity is equivalent to the flow quantity of the standard EXV taking 102 half steps, thereby preventing the relatively large deviation in flow quantity caused by performing the flow adjustment on the EXV according to the original target position.

Through the above position conversion, the EXV opens at the substantially same values in the target position signal in the LIN command frame sent from the LIN master node, for example, the EXV opens at 32 half steps, and thus from the point of controlling the EXV, the EXV with the valve opening deviation is calibrated as a standard electronic expansion valve.

Figure 9A:
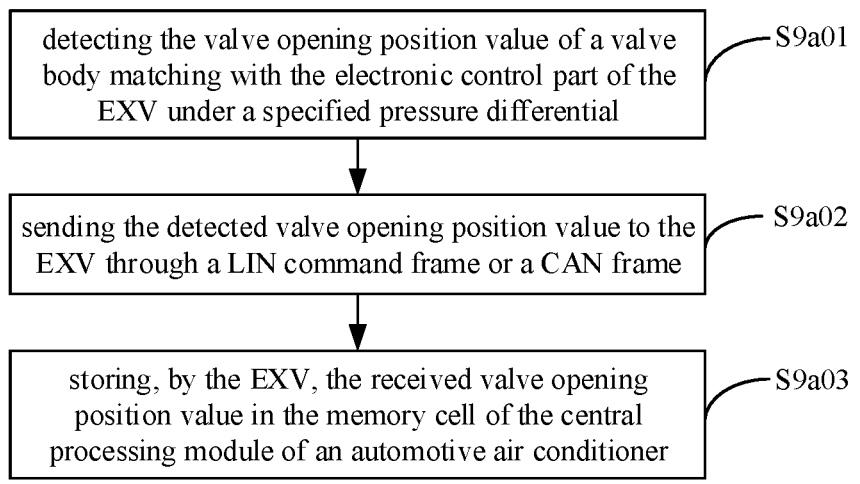
FIGS. 9a and 9b are schematic views showing a first control method for performing valve opening position adjustment of the electronic expansion valve shown in FIG. 4.
Figure 9B:
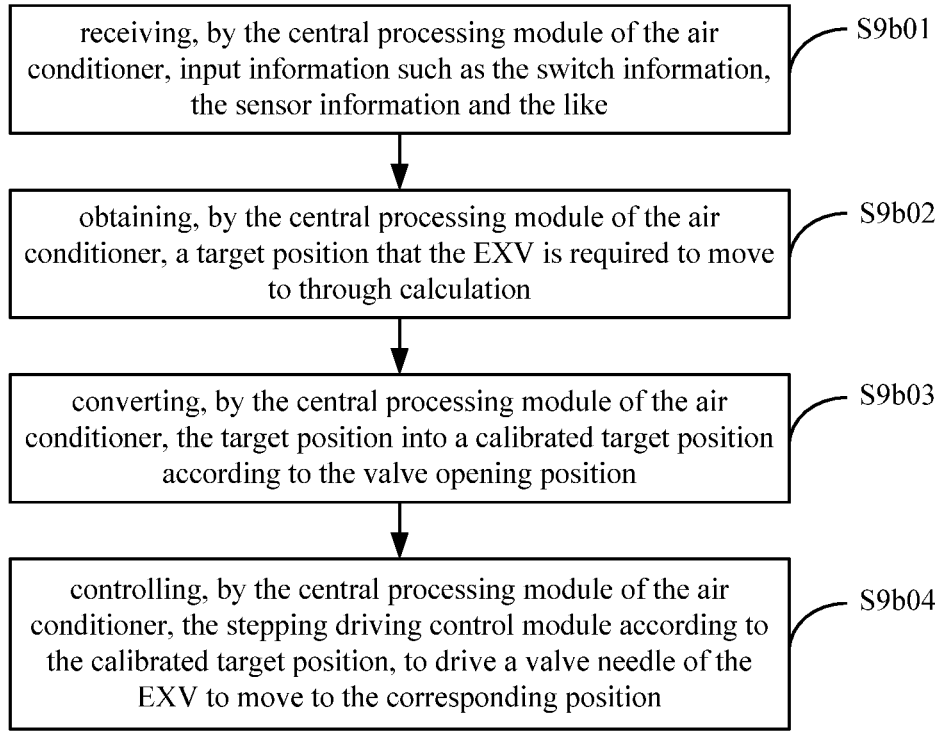

Referring to the control method shown in FIG. 9 (including FIG. 9a and FIG. 9b), which schematically shows an embodiment of the air conditioning system in FIG. 4, the electronic control part of the EXV can be integrally arranged in the air conditioning controller 63, and the electronic control part of the EXV does not exist independently as a LIN slave node.

Referring to FIG. 9a, in this embodiment, the stage of the EXV acquiring its own valve opening position includes the following steps:

S9a01: detecting the valve opening position value of a valve body matching with the electronic control part of the EXV under a specified pressure differential;

S9a02: sending the detected valve opening position value to the EXV through a LIN command frame or a CAN frame; and S9a03: storing, by the EXV, the received valve opening position value in the memory cell of the central processing module of an automotive air conditioner.

Referring to FIG. 9b, in this embodiment, the stage of calibrating the valve opening position of the EXV includes the following steps:

S9b01: receiving, by the central processing module 621, 630 of the air conditioner, input information such as the switch information, the sensor information and the like;

S9b02: obtaining, by the central processing module 621, 630 of the air conditioner, a target position that the EXV is required to move to through calculation;

S9b03: converting, by the central processing module 621, 630 of the air conditioner, the target position into a calibrated target position according to the valve opening position; and S9b04: controlling, by the central processing module 621, 630 of the air conditioner, the stepping driving control module according to the calibrated target position, to drive a valve needle of the EXV to move to the corresponding position.

Figure 10A:
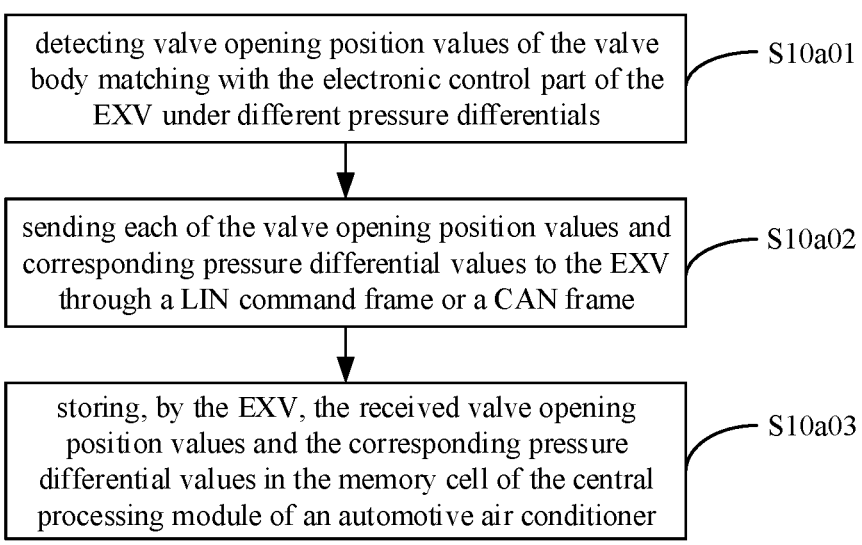
FIGS. 10a and 10b are schematic views showing a second control method for performing valve opening position adjustment of the electronic expansion valve shown in FIG. 4.
Figure 10B:
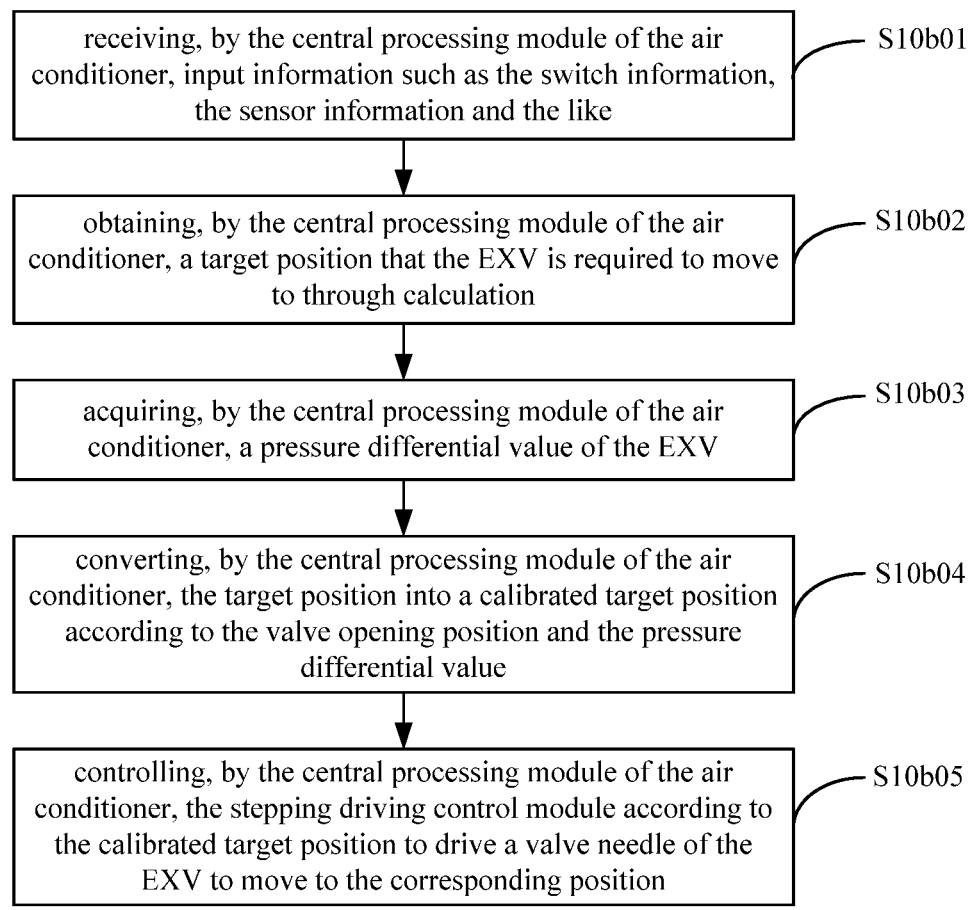

Referring to the control method shown in FIG. 10 (including FIG. 10a and FIG. 10b), which schematically shows another embodiment of the air conditioning system in FIG. 4, and this embodiment can further correct the effect caused by the pressure differential compared with the control method in FIG. 9.

Referring to FIG. 10a, in this embodiment, the stage of the EXV acquiring its own valve opening position includes the following steps:

S10a01: detecting valve opening position values of the valve body matching with the electronic control part of the EXV under different pressure differentials;

S10a02: sending each of the valve opening position values and corresponding pressure differential values to the EXV through a LIN command frame or a CAN frame; and S10a03: storing, by the EXV, the received valve opening position values and the corresponding pressure differential values in the memory cell of the central processing module of an automotive air conditioner.

Referring to FIG. 10b, in this embodiment, the stage of calibrating the valve opening position of the EXV includes the following steps:

S10b01: receiving, by the central processing module of the air conditioner, input information such as the switch information, the sensor information and the like;

S10b02: obtaining, by the central processing module of the air conditioner, a target position that the EXV is required to move to through calculation;

S10b03: acquiring, by the central processing module of the air conditioner, a pressure differential value of the EXV;

S10b04: converting, by the central processing module of the air conditioner, the target position into a calibrated target position according to the valve opening position and the pressure differential value; and S10b05: controlling, by the central processing module of the air conditioner, the stepping driving control module according to the calibrated target position to drive a valve needle of the EXV to move to the corresponding position.

By controlling the adjustment of the valve opening position of the electronic expansion valve, the present application can convert the target position into the calibrated target position, to reduce the valve opening deviation of the electronic expansion valve under different pressure differentials and/or the valve opening deviation between different electronic expansion valves in the system, which allows the electronic expansion valve to be adjusted to a standard electronic expansion valve without changing the structure, thus improves the consistency of the flow curves of a refrigerant system, moreover, compared with the solution of employing the mechanical structure design to reduce or eliminate the valve opening deviation, the present application can further reduce the cost caused by the manufacturing and assembly technology.

The embodiments described hereinabove are only preferred embodiments of the present application, and are not intended to limit the scope of the present application in any form. Although the present application is disclosed by the above preferred embodiments, the preferred embodiments are not intended to limit the present application. For those skilled in the art, many variations, modifications or equivalent replacements may be made to the technical solutions of the present application by using the methods and technical contents disclosed hereinabove, without departing from the scope of the technical solutions of the present application. Therefore, any simple modifications, equivalent replacements and modifications, made to the above embodiments based on the technical essences of the present application without departing from the technical solutions of the present application, are deemed to fall into the scope of protection of the technical solution of the present application.

What we claim is:

1. An air conditioning system, comprising a compressor, a first heat exchanger, a second heat exchanger, a first evaporator, a second evaporator, a first electronic expansion valve and a second electronic expansion valve, wherein the first heat exchanger is arranged in a pipe between an outlet of the compressor and inlets of the first electronic expansion valve and the second electronic expansion valve;

the second heat exchanger comprises a first heat exchange portion and a second heat exchange portion, the first heat exchange portion and the second heat exchange portion are configured to exchange heat with each other, the first heat exchange portion of the second heat exchanger is arranged in a pipe between an outlet of the first heat exchanger and the inlets of the first electronic expansion valve and the second electronic expansion valve, and the second heat exchange portion of the second heat exchanger is arranged in a pipe between outlets of the first evaporator and the second evaporator and an inlet of the compressor;

the first evaporator and the second evaporator are arranged in parallel, the first electronic expansion valve and the first evaporator are arranged in series, and the second electronic expansion valve and the second evaporator are arranged in series; and the air conditioning system is configured to adjust an opening degree of each of the first electronic expansion valve and the second electronic expansion valve separately, the first electronic expansion valve and the second electronic expansion valve are each configured to perform position adjustment according to valve opening position information, stored by the air conditioning system, of the first electronic expansion valve and the second electronic expansion valve, to adjust a target position to a calibrated target position; wherein the valve opening position information is embodied as valve opening position values of the electronic expansion valve corresponding to different set pressure differential values, the valve opening position values corresponding to the different set pressure differential values are detected by a position detector, and the pressure differential values are detected by a pressure detector; and wherein each of the valve opening position values is a corresponding number of steps taken by a stepping motor operating from a fully closed position until the electronic expansion valve starts to allow fluid to pass through.

2. The air conditioning system according to claim 1, wherein the air conditioning system is a heat ventilation and air-conditioning system, the air conditioning system further comprises a third electronic expansion valve and a cooler, the third electronic expansion valve and the cooler are located between the outlet of the first heat exchanger and the inlet of the compressor, and the cooler is arranged in parallel with the first evaporator and the second evaporator.

3. The air conditioning system according to claim 1, wherein the third electronic expansion valve and the cooler are arranged in series, a flow quantity of a refrigerant in a branch where the cooler is located is controlled by adjusting an opening degree of the third electronic expansion valve, the cooler is a cooling element for a heat-generating component and is configured to reduce a temperature of the heat-generating component, and the third electronic expansion valve is configured to perform position adjustment according to valve opening position information stored in the air conditioning system, to adjust a target position to a calibrated target position.

4. A control system for an air conditioning system, comprising an air conditioning controller and an electronic control part configured to control an electronic expansion valve to move, the air conditioning controller is a control center of the air conditioning system and is configured to receive and parse a control signal and/or input information of a vehicle system or a control panel, and send a control signal generated from parsing to the electronic expansion valve, and the electronic expansion valve is configured to be controlled by the control signal;

the air conditioning controller comprises a memory cell or the electronic control part comprises a memory cell, wherein the memory cell is configured to at least store detected valve opening position information of the electronic expansion valve; and the control system is configured to control a target position of the electronic expansion valve to be converted into a calibrated target position according to the valve opening position information provided by the memory cell and a current pressure differential; wherein the valve opening position information is embodied as valve opening position values of the electronic expansion valve corresponding to different set pressure differential values, and the valve opening position values and the corresponding pressure differential values are stored in the memory cell; the valve opening position values are detected by a position detector, and the pressure differential values are detected by a pressure detector; and wherein each of the valve opening position values is a corresponding number of steps taken by a stepping motor operating from a fully closed position until the electronic expansion valve starts to allow fluid to pass through.

5. The control system for the air conditioning system according to claim 4, wherein the memory cell is arranged in a central processing module of the air conditioning controller or a central processing module of the electronic control part of the electronic expansion valve, and the memory cell is formed by a non-volatile memory element.

6. The control system for the air conditioning system according to claim 4, wherein the control signal comprises a target position signal for the electronic expansion valve, and in a program for adjusting an opening degree of the electronic expansion valve, the electronic expansion valve is configured to convert a value of the target position signal into a calibrated target position value according to the target position signal provided by the control system;

or, the control system is configured to detect the current pressure differential of the electronic expansion valve, obtain an adjusted target position value according to the current pressure differential, and convert the adjusted target position value into a calibrated target position value;

or, the control signal comprises a target position signal and a pressure differential signal for the electronic expansion valve, and in a program for adjusting an opening degree of the electronic expansion valve, a value of the target position signal is converted into a calibrated target position value according to the pressure differential signal provided by the control system.

7. The control system for the air conditioning system according to claim 4, wherein the valve opening position information is sent to the electronic expansion valve in a local internet network control mode or a controller local area internet network control mode; and the electronic expansion valve is configured to receive a target position signal provided by the control system and store a value of the target position signal in the memory cell, or, the control system is configured to obtain the target position of the electronic expansion valve through calculation by the central processing module according to an input signal.

8. The control system for the air conditioning system according to claim 7, wherein the control signal provided by the air conditioning controller to the electronic expansion valve is a LIN signal, the control signal comprises at least two LIN data bytes, each of the LIN data bytes comprises eight data bits, stored original position information is indicated as all 8 bits of an Nth byte and two low-order bits of an (N+1)th byte (bit0 and bit1), and the pressure differential signal is expressed as six high-order bits of the (N+1)th byte (bit2 to bit7), wherein N is equal to or greater than 1, and the air conditioning controller is configured to send the target position signal and the pressure differential signal to the electronic expansion valve through the control signal, to perform valve opening position adjustment.

9. A control method for an air conditioning system, comprising a control method for controlling an electronic expansion valve of the air conditioning system, wherein the control method for controlling the electronic expansion valve comprises a stage of the electronic expansion valve acquiring its own valve opening position and a stage of calibrating the valve opening position of the electronic expansion valve;

in the stage of the electronic expansion valve acquiring its own valve opening position, the air conditioning system detects valve opening position values of the electronic expansion valve corresponding to different set pressure differential values by arranging a position detector, and detects the pressure differential values by arranging a pressure detector, and stores the valve opening position values and the corresponding pressure differential values in a memory cell; and in the stage of calibrating the valve opening position of the electronic expansion valve, the control method comprises controlling the electronic expansion valve to perform position adjustment according to valve opening position information and a current pressure differential, to adjust a target position value to a calibrated target position value; and wherein the valve opening position information is embodied as the valve opening position values of the electronic expansion valve corresponding to the pressure differential values; and each of the valve opening position values is a corresponding number of steps taken by a stepping motor operating from a fully closed position until the electronic expansion valve starts to allow fluid to pass through.

10. The control method for the air conditioning system according to claim 9, wherein the control method for the electronic expansion valve to acquire its own valve opening position comprises:

detecting a valve opening position value of the electronic expansion valve under a specified pressure differential;

sending, by the air conditioning system, the valve opening position value to the electronic expansion valve in a local internet network control mode or a controller local area internet network control mode; and storing, by the electronic expansion valve, the valve opening position value in a memory cell of a central processing module of the electronic expansion valve or a memory cell of a central processing module of the air conditioning system;

or, the control method for the electronic expansion valve to acquire its own valve opening position comprises:

detecting valve opening position values of the electronic expansion valve under different pressure differentials;

sending each of the valve opening position values and corresponding pressure differential information to the electronic expansion valve in a local internet network control mode or a controller local area internet network control mode; and storing, by the electronic expansion valve, each of the valve opening position values and the corresponding pressure differential information in a memory cell of a central processing module of the electronic expansion valve or a memory cell of a central processing module of the air conditioning system.

11. The control method for the air conditioning system according to claim 9, wherein the stage of calibrating the valve opening position of the electronic expansion valve comprises:

sending, by a central processing module of the air conditioning system, a LIN command frame comprising a target position signal to the electronic expansion valve;

receiving, by the electronic expansion valve, the LIN command frame and storing, by the electronic expansion valve, a value of the target position signal in a memorizer of the electronic expansion valve;

converting, by the electronic expansion valve, the value of the target position signal into a calibrated target position value; and controlling the electronic expansion valve to move to a corresponding position according to the calibrated target position value;

or, the stage of calibrating the valve opening position of the electronic expansion valve comprises:

sending, by a central processing module of the air conditioning system, a LIN command frame comprising a target position signal and a pressure differential signal to the electronic expansion valve;

receiving, by the electronic expansion valve, the LIN command frame and storing, by the electronic expansion valve, a value of the target position signal and a value of the pressure differential signal in a memory cell of the electronic expansion valve;

converting, by the electronic expansion valve, the value of the target position signal into a calibrated target position value according to the value of the pressure differential signal; and controlling the electronic expansion valve to move to a corresponding position according to the calibrated target position value.

12. The control method for the air conditioning system according to claim 9, wherein the stage of calibrating the valve opening position of the electronic expansion valve comprises:

obtaining, by a central processing module of the air conditioning system, a target position of the electronic expansion valve through calculation according to the detected current pressure differential.

13. The air conditioning system according to claim 2, wherein the third electronic expansion valve and the cooler are arranged in series, a flow quantity of a refrigerant in a branch where the cooler is located is controlled by adjusting an opening degree of the third electronic expansion valve, the cooler is a cooling element for a heat-generating component and is configured to reduce a temperature of the heat-generating component, and the third electronic expansion valve is configured to perform position adjustment according to valve opening position information stored in the air conditioning system, to adjust a target position to a calibrated target position.

14. The control system for the air conditioning system according to claim 5, wherein the control signal comprises a target position signal for the electronic expansion valve, and in a program for adjusting an opening degree of the electronic expansion valve, the electronic expansion valve is configured to convert a value of the target position signal into a calibrated target position value according to the target position signal provided by the control system;

or, the control system is configured to detect the current pressure differential of the electronic expansion valve, obtain an adjusted target position value according to the current pressure differential, and convert the adjusted target position value into a calibrated target position value;

or, the control signal comprises a target position signal and a pressure differential signal for the electronic expansion valve, and in a program for adjusting an opening degree of the electronic expansion valve, a value of the target position signal is converted into a calibrated target position value according to the pressure differential signal provided by the control system.

15. The control system for the air conditioning system according to claim 5, wherein the valve opening position information is sent to the electronic expansion valve in a local internet network control mode or a controller local area internet network control mode; and the electronic expansion valve is configured to receive a target position signal provided by the control system and store a value of the target position signal in the memory cell, or, the control system is configured to obtain the target position of the electronic expansion valve through calculation by the central processing module according to an input signal.

16. The control system for the air conditioning system according to claim 15, wherein the control signal provided by the air conditioning controller to the electronic expansion valve is a LIN signal, the control signal comprises at least two LIN data bytes, each of the LIN data bytes comprises eight data bits, stored original position information is indicated as all 8 bits of an Nth byte and two low-order bits of an (N+1)th byte (bit0 and bit1), and the pressure differential signal is expressed as six high-order bits of the (N+1)th byte (bit2 to bit7), wherein N is equal to or greater than 1, and the air conditioning controller is configured to send the target position signal and the pressure differential signal to the electronic expansion valve through the control signal, to perform valve opening position adjustment.

17. The control system for the air conditioning system according to claim 6, wherein the valve opening position information is sent to the electronic expansion valve in a local internet network control mode or a controller local area internet network control mode; and the electronic expansion valve is configured to receive a target position signal provided by the control system and store a value of the target position signal in the memory cell, or, the control system is configured to obtain the target position of the electronic expansion valve through calculation by the central processing module according to an input signal.

18. The control system for the air conditioning system according to claim 17, wherein the control signal provided by the air conditioning controller to the electronic expansion valve is a LIN signal, the control signal comprises at least two LIN data bytes, each of the LIN data bytes comprises eight data bits, stored original position information is indicated as all 8 bits of an Nth byte and two low-order bits of an (N+1)th byte (bit0 and bit1), and the pressure differential signal is expressed as six high-order bits of the (N+1)th byte (bit2 to bit7), wherein N is equal to or greater than 1, and the air conditioning controller is configured to send the target position signal and the pressure differential signal to the electronic expansion valve through the control signal, to perform valve opening position adjustment.

19. The control system for the air conditioning system according to claim 14, wherein the valve opening position information is sent to the electronic expansion valve in a local internet network control mode or a controller local area internet network control mode; and the electronic expansion valve is configured to receive a target position signal provided by the control system and store a value of the target position signal in the memory cell, or, the control system is configured to obtain the target position of the electronic expansion valve through calculation by the central processing module according to an input signal; and the control signal provided by the air conditioning controller to the electronic expansion valve is a LIN signal, the control signal comprises at least two LIN data bytes, each of the LIN data bytes comprises eight data bits, stored original position information is indicated as all 8 bits of an Nth byte and two low-order bits of an (N+1)th byte (bit0 and bit1), and the pressure differential signal is expressed as six high-order bits of the (N+1)th byte (bit2 to bit7), wherein N is equal to or greater than 1, and the air conditioning controller is configured to send the target position signal and the pressure differential signal to the electronic expansion valve through the control signal, to perform valve opening position adjustment.

* * * * *